United States Patent [19]

Hitchcock et al.

[11] 4,452,374
[45] Jun. 5, 1984

[54] MANUFACTURE OF DRAW-REDRAW CANS USING AN IRRADIATED FILM LAMINATED OR EXTRUSION COATED STEEL SHEET MATERIAL

[75] Inventors: Martin K. Hitchcock, Newark; Craig W. Potter, Findlay; Floyd E. Romesberg, Granville, all of Ohio

[73] Assignee: The Dow Chemical Company, Midland, Mich.

[21] Appl. No.: 250,354

[22] Filed: Apr. 2, 1981

[51] Int. Cl.³ .......................................... B65D 90/04
[52] U.S. Cl. .................................. 220/458; 220/456; 72/46
[58] Field of Search ............... 220/454, 455, 456, 457, 220/458; 72/347, 348, 349, 46; 428/344, 345, 349, 461, 483

[56] References Cited

U.S. PATENT DOCUMENTS

| | | | |
|---|---|---|---|
| 2,406,039 | 8/1946 | Roedel | 117/132 |
| 3,671,295 | 6/1972 | Pavve et al. | 117/93.31 |
| 3,826,628 | 7/1974 | Addinall | 29/195 |
| 4,292,463 | 9/1981 | Bow | 174/107 |

FOREIGN PATENT DOCUMENTS

| | | |
|---|---|---|
| 2614660 | 10/1977 | Fed. Rep. of Germany . |
| 2939986 | 6/1980 | Fed. Rep. of Germany . |
| 2933574 | 3/1981 | Fed. Rep. of Germany . |
| 54-133578 | 10/1979 | Japan . |
| 54-133577 | 10/1979 | Japan . |
| 55-18171 | 5/1980 | Japan . |
| 55-20866 | 6/1980 | Japan . |
| 55-5079139 | 6/1980 | Japan . |
| 1563030 | 3/1980 | United Kingdom . |

*Primary Examiner*—Leon Gilden
*Attorney, Agent, or Firm*—J. B. Guffey; D. R. Howard

[57] ABSTRACT

The use of organic solvent-based coating compositions in the preparation of coated steel feedstock for use in the manufacture of draw-redraw food and beverage cans is eliminated by using as such can feedstock a laminated or extrusion coated steel sheet (e.g., such as electrolytic chrome/chrome oxide coated steel) having adhered to both major planar surfaces thereof an irradiated multilayered synthetic thermoplastic resin coating comprising:

(1) an adhesive synthetic thermoplastic resin inner layer which is composed of at least a major proportion of a normally solid random copolymer of ethylene with from about 1 to about 30 weight percent, based upon the weight of such copolymer, of an ethylenically unsaturated carboxylic acid monomer and which is bonded directly to the surface of said steel sheet and (2) an outer layer of a synthetic thermoplastic polymer resin which has a crystalline melting point of at least about 250° F. and which is adhered to said adhesive resin inner layer.

13 Claims, 2 Drawing Figures

MANUFACTURE OF DRAW-REDRAW CANS USING AN IRRADIATED FILM LAMINATED OR EXTRUSION COATED STEEL SHEET MATERIAL

BACKGROUND OF THE INVENTION

The present invention in one aspect relates generally to the manufacture of metallic food and beverage cans and more particularly to the manufacture of 2-piece cans via a draw-redraw metal forming process. In another aspect, the present invention relates to the use of an extrusion coated or film laminated plastic/metal/plastic laminate as the feed stock in a draw-redraw steel can body forming process.

Metallic cans of various types and sizes find widespread commercial use in the packaging of a wide variety of foods and beverages. In such food and beverage packaging usage, it is generally desired to avoid direct contact between the food or beverage to be packaged and the metallic substance from which the container is manufactured. To that end, metallic cans for food and beverage packaging are typically coated on at least their interior surfaces with a coating of a relatively inert organic substance.

Historically, such organic can coatings were typically deposited or applied from relatively low solids organic solvent-based solutions. However, in more recent times, environmental concerns and regulations requiring substantial reductions in airborne emissions from various industrial facilities have prompted a need for can coatings and can coating processes involving substantially less organic solvent usage (and thus substantially less potential for undesired airborne organic solvent emissions) than is normally encountered with the use of said low solids organic solvent-based solutions.

In response to the aforementioned environmental concerns and the attendant need for reduced solvent emission, certain waterborne and high solids organic solvent-based can coating compositions have been developed. Unfortunately, while such waterborne and high solids organic systems appear to be potentially suitable for use in certain types of can manufacturing operations (e.g., as coatings in the manufacture of 3-piece rolled and seamed cans and in coating the exterior and/or interior surface of pre-formed aluminum and/or steel cans made by the draw and iron can forming process), they are not generally satisfactory for use in draw-redraw can forming processes in which the coating on the pre-coated steel can stock is required to withstand the rather severe mechanical stresses involved in the can forming operation. Moreover, even the organic solvent or plasticizer-based polyvinyl chloride, epoxy and epoxy phenolic systems conventionally employed to prepare can sheet or can coil stock for use in draw-redraw can forming operations are somewhat limited in terms of the maximum depth to diameter draw ratio (i.e., severity of draw) which can be tolerated without coating failure.

In view of the foregoing, it is an object of the present invention to provide an improvement in the manufacture of steel food or beverage cans by the draw-redraw process whereby the use of organic solvent-based coatings for the steel feed stock can be eliminated. In addition, it is also an object of this invention to provide a means by which draw-redraw containers can be manufactured having equal or greater depth to diameter draw ratio capability than is currently possible using the conventional solvent or plasticizer based coating technology. Finally, it is also an object of this invention to provide a means by which film laminated or extrusion coated plastic/steel/plastic laminate material can be suitably employed to prepare retortable can bodies via a draw-redraw metal forming process.

SUMMARY OF THE INVENTION

These and other objects are achieved in accordance with the present invention (A) by the use, as the coated steel feedstock in a draw-redraw process for the manufacture of steel food or beverage can bodies, of a laminated or extrusion coated steel sheet material having adhered to both major planar surfaces thereof a multilayered synthetic thermoplastic resin coating comprising (1) an adhesive synthetic thermoplastic resin inner layer which comprises at least a major proportion of a normally solid random copolymer derived from the copolymerization of a major portion of ethylene with from about 1 to about 30 weight percent based upon such copolymer of an ethylenically unsaturated carboxylic acid monomer and which is bonded directly to the surface of said steel sheet material and (2) an outer layer of a synthetic thermoplastic polymer resin which has a crystalline melting point of at least about 250° F. and which is adhered to said adhesive resin inner layer and (B) by subjecting such multilayered coatings, either prior to, during or subsequent to the application thereof to the steel sheet material, to an electron beam irradiation dosage of from about 2 to about 20 megarads.

Such invention is particularly beneficial in that it permits the preparation of retortable plastic coated draw-redraw beverage and food cans without the use of organic solvent or plasticizer based coatings systems. Moreover, such invention is especially beneficial and surprising in that it facilitates the preparation of retortable draw-redraw cans having equal or greater draw ratio capabilities (i.e., capable of surviving equal or greater depth to diameter draws) relative to that which is normally possible with coated steel can sheet stock prepared using the conventional organic solvent or plasticizer based canstock coating systems. Further, the subject laminates can also oftentimes obviate the need for using external lubricants in the draw-redraw can forming process.

DETAILED DESCRIPTION OF THE INVENTION

Figure 1:
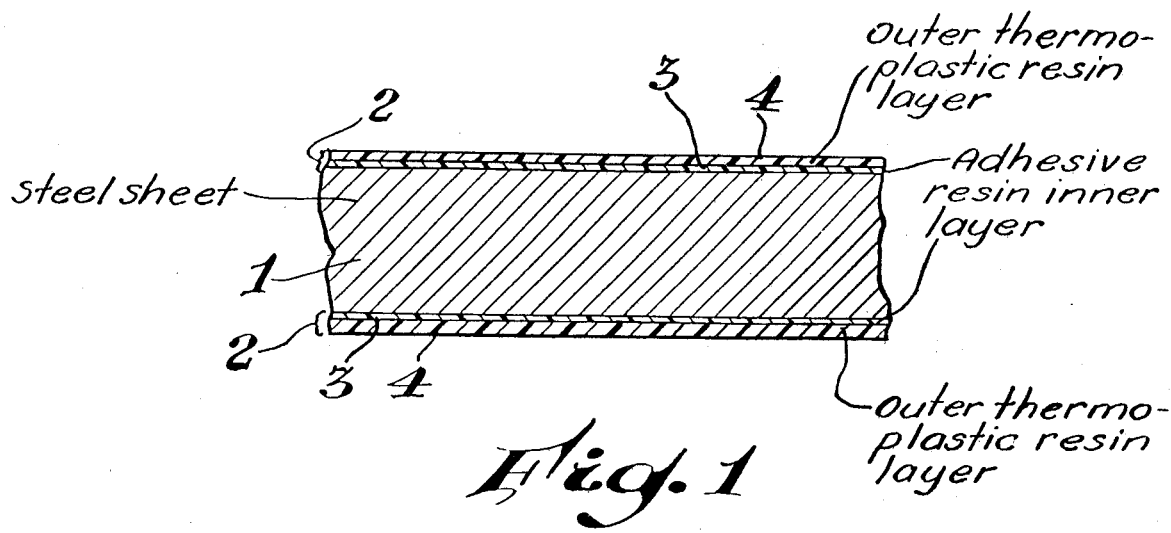
FIG. 1 is a fragmentary sectional view of a coated steel sheet suitable for use in the practice of the present invention.
Figure 2:
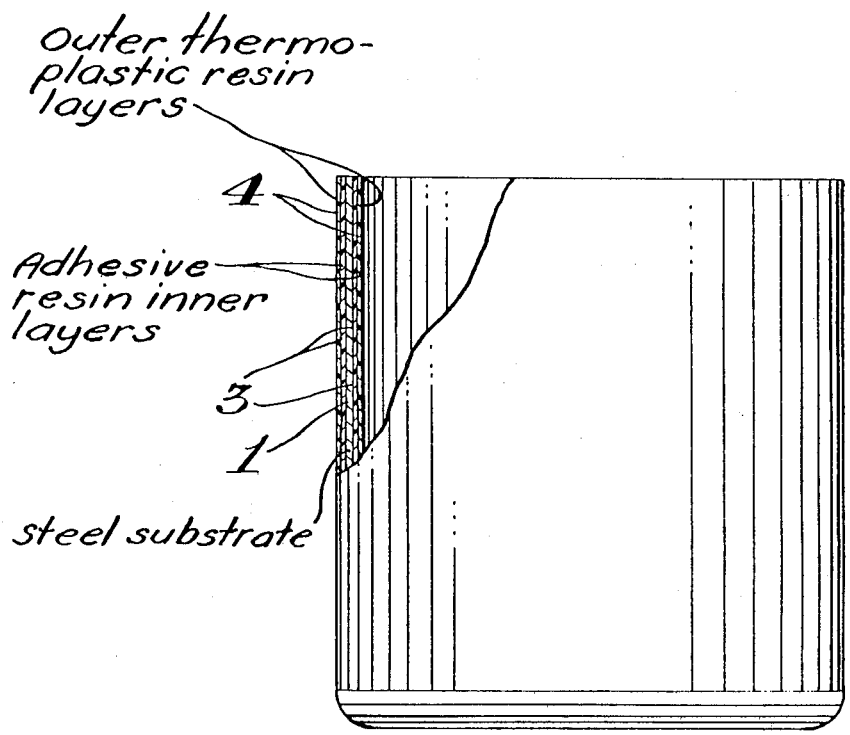
FIG. 2 is a sectional view of a schematic representation of a drawn-redrawn can body made in accordance with the present invention.

As has been indicated, and as is illustrated in FIGS. 1 and 2, the coated steel sheet employed in the practice of the present invention comprises a steel sheet (1) having adhered to both major planar surfaces thereof a multilayered synthetic thermoplastic resin coating (2) which in turn comprises an adhesive synthetic thermoplastic resin inner layer (3) bonded directly to the surface of said steel sheet and an outer layer (4) of a synthetic thermoplastic polymer resin which has a crystalline melting point of at least about 250° F., and which is adhered to said adhesive resin inner layer.

Steel sheet materials suitably employed in the practice of the present invention include steel sheet materials whose surface exhibits good adhesion to the adhesive synthetic thermoplastic inner layer which is directly bonded to said surface. Examples of such steel sheet materials include those types of chemically or electrochemically coated (e.g., electrolytically plated) steel sheetstocks already known in the art to be useful in the manufacture of food and beverage containers. Preferably, the steel sheetstock employed is a non-ferrous metal coated steel, especially chromium/chromium oxide coated steel (also commonly referred to in the art as tin-free steel, chrome/chrome oxide coated steel and as electrolytically chrome coated steel or "ECCS") which bears a composite coating of chrome and chrome oxide on both major planar surfaces of said steel sheet. Various species or versions of such chromium/chromium oxide coated steels are described in U.S. Pat. Nos. 3,475,295; 3,479,162; 3,526,486; 3,532,608; 3,567,599; 3,755,091; 3,816,082; 3,827,866; 3,828,628; 3,838,024 and Canadian Patent No. 808,630, the pertinent teachings of which are hereby incorporated by reference.

The thickness of the aforementioned steel sheetstock material which is employed in the practice of the present invention corresponds to that employed in conventional draw-redraw can manufacturing operations and is typically in the range of from about 5 to about 15 mils. Preferably, such thickness is in the range of from about 7 to about 10 mils.

The adhesive synthetic thermoplastic resin employed to form the innermost layer of the above-noted multilayered synthetic thermoplastic resin coating (i.e., the layer directly bonded to the steel sheet surface) comprises at least a major proportion of a normally solid random copolymer of ethylene with from about 1 to about 30 weight percent of an ethylenically unsaturated carboxylic acid monomer. Preferably, such ethylene/unsaturated carboxylic acid copolymer exhibits an initial 90° peel strength at ambient temperature (i.e., 25° C.) of at least about 15 pounds per inch (preferably at least 20 pounds per inch and most preferably about 25 pounds per inch) when measured pursuant to ASTM D 1876 in the form of a steel/adhesive layer/steel sandwich construction in which each steel layer has a thickness of 6 mil.

Examples of resins suitably employed as the aforementioned adhesive resin inner layer include copolymers comprising a major portion of ethylene and a minor proportion of an ethylenically unsaturated carboxylic acid monomer such as (1) an ethylenically unsaturated mono- or polybasic carboxylic acids per se (e.g., acrylic acid, methacrylic acid, crotonic acid, fumaric acid, maleic acid, itaconic acid, etc.); (2) partial esters of polybasic ethylenically unsaturated acids (e.g., monomethyl maleate, monoethyl maleate, monomethyl fumarate, monoethyl fumarate, tripropylene glycol monomethyl ether acid maleate, ethylene glycol monophenol ether acid maleate, etc.); (3) anhydrides of polybasic ethylenically unsaturated carboxylic acids (e.g., maleic anhydride, etc.) and the like. In addition, partially neutralized versions of the aforementioned carboxylic acid containing polymers, generally referred to in the art as ionomers, can also be suitably employed. Further, the above-noted adhesive resins can consist essentially of ethylene and one or more of the indicated carboxylic acid or anhydride monomers or such resins can further contain a minor amount (e.g., up to about 20 weight percent) of other types of monomers copolymerizable therewith such as, for example, esters of acrylic or methacrylic acid and the like.

Preferably, the thermoplastic ethylene copolymer resin employed in the adhesive layer comprises a major portion of ethylene copolymerized with from 1 to about 30 (especially from 2 to about 20) percent by weight of acrylic or methacrylic acid including such copolymers which further comprise a minor proportion (e.g., up to about 20 percent) of other copolymerizable monomers such as, for example, lower alkanol esters of acrylic or methacrylic acid. The thickness of each of the individual adhesive resin inner layers on the plastic coated steel sheets used in the practice of the present invention is typically in the range of from about 0.1 to about 1.4 mils (preferably from about 0.2 to about 0.8 mils).

As has been noted, each of the outer layers in the aforementioned multilayered thermoplastic resin coatings is composed of a synthetic thermoplastic resin which has a crystalline melting point of at least about 250° F. Preferably, the crystalline melting point of such synthetic thermoplastic resin is greater than 250° F. This feature is important in order that the layer composed of such resin does not become a flowable melt under the conditions employed in the food processing operation but instead maintains its integrity as a protective coating layer during such operation. In addition, it is also important that the synthetic thermoplastic resin employed in such layer be relatively gouge resistant as well as being relatively inert or impervious upon exposure both to water and greases and to the various foodstuffs and/or beverages to be ultimately packaged in the subject draw-redraw cans both at the elevated temperatures typically employed during the post-canning processing operations (e.g., in retorting operations) and at the ambient temperaures encountered during storage pending final consumption of such food or beverage contents. Further, it is also important that the thermoplastic resin employed in such outer resin layer possess (a) sufficient strength and toughness to withstand the rather severe stresses imparted thereto during formation of the draw-redraw can body from the instant plastic/metal/plastic laminates as well as (b) sufficient adhesiveness to the above-described adhesive resin inner layer to prevent delamination therefrom during such can forming operation and during the subsequent food or beverage canning and/or processing operations.

Examples of synthetic thermoplastic resins suitable for use in the aforementioned ≧250° F. melting point outer layers include high density polyethylene (e.g., having a density in the range of from 0.950 to about 0.965 g/cc and a melt index in the range of from 0.05 to about 5) polypropylene, polyamides, polyesters, ethylene/propylene copolymers and the like. Further, blends of these ≧250° F. melting point resins with resins of lower melting or softening points (e.g., low density polyethylene, ethylene/acrylate copolymers, ethylene/vinyl acetate copolymers, ethylene/acrylic or methacrylic acid copolymers, ionomers, chlorinated polyethylene, etc.) can also be employed so long as the melting point of the resulting blend remains at or above about 250° F. Indeed, in those instances where a high density polyethylene resin is employed as the predominant component of the outer resin layer, it has been found to be especially advantageous to employ a blend of such high density polyethylene with up to about 30 weight percent, based upon the blend weight of a low density polyethylene therein. Resins which are particularly preferred for use as the outermost coatings layers include high density polyethylene having densities of at least about 0.960 g/cc (e.g., from 0.960 to about 0.965 g/cc) and melt indexes of 3 or less (e.g., from about 0.05 to about 3); blends of such high density polyethylenes with up to about 30 weight percent of low density polyethylene; and polyamide resins such as nylon 6, nylon 6/9 and nylon 6/12.

The thickness of each of the indicated $\geq 250°$ F. melting point outer resin layers is typically from about 0.1 to about 1.4 mils (preferably from about 0.2 to about 0.8 mils).

As has been noted, one of the primary objects of the present invention is to provide a means of avoiding the use of organic solvent based coatings in the manufacture of draw-redraw food and beverage cans. Accordingly, the hereinbefore described multilayered plastic coated steel container stock employed in the practice of the present invention is prepared using conventional extrusion coating or film laminating techniques. In such coating operations, the individual layers of the multilayered plastic coatings (i.e., the adhesive inner layers and the $\geq 250°$ F. melting point outer layers) can be applied separately or they can be applied simultaneously either via coextrusion coating technology or by lamination of a previously prepared (e.g., coextruded) multilayered film of the type desired for the multilayered plastic coating.

Preferably, the individual layers of the multilayered plastic coatings are applied simultaneously by either coextrusion or multilayer film lamination techniques. However, in an alternative embodiment, it is also possible to arrive at the desired type of multilayer plastic coated can stock without the use of organic solvent based coating systems by first applying the adhesive synthetic thermoplastic resin inner layers to the steel substrate from an aqueous dispersion of such resin (e.g., such as the ammoniated aqueous dispersions described in U.S. Pat. No. 3,799,901) and thereafter applying the $\geq 250°$ F. melting point resin outer layers to the exposed surfaces of the adhesive resin inner layers via either extrusion coating or film lamination techniques.

Regardless of how the above-noted multilayered coatings are applied in the present invention, it is generally preferable to post-heat the resulting laminate prior to the can forming step at a temperature above the melting point of the highest melting resin employed in said multilayered coating for a short period of time such as, for example, for a period of up to about 5 minutes or so.

The use of the hereinbefore described multilayer plastic coated can stock in the actual can forming operations is conducted generally pursuant to conventional draw-redraw can forming techniques and, naturally, such operation can consist of either a single draw or multiple drawing steps depending upon the ultimate depth of draw (or draw ratio) required for the particular type of can to be formed in such operation.

The formation of can bodies (especially deep drawn can bodies) by the draw-redraw forming process imparts a high degree of stress to the container stock employed and a significant amount of unrelieved residual stress can remain in the plastic coating employed on such container stock following can body formation therefrom. It is therefore important in the practice of the present invention that the multilayer plastic coating employed has sufficient strength and adhesion to withstand such residual stresses without coating failure during the ambient temperature storage of foods and beverages therein. In addition, since food and/or beverage canning operations often involve processing at elevated temperatures (e.g., such as steam processing at about 250° F.) for prolonged periods of time (e.g. as much as an hour or an hour and a half at such elevated temperatures), it is also important that multilayered plastic coating employed exhibits sufficient strength and adhesion to avoid coating failure under such conditions.

In the case of the hereinbefore described random ethylene/carboxylic acid monomer adhesive resins, it has been found that, while such resins generally exhibit adequate ambient temperature (e.g., 20 to 25° C.) strength properties to generally withstand the aforementioned residual stresses at normal room temperatures, the elevated temperature strength properties of such resins are not normally sufficient to withstand such residual stresses at the elevated temperatures (e.g., usually about 250° F.) normally employed in food or beverage canning and processing operations. Fortunately, however, it has also been found that the elevated temperature strength and/or viscoelastic properties of such adhesive resins can be sufficiently enhanced so as to meet the above-noted elevated temperature (e.g., retorting temperature) performance requirements by crosslinking the same via the use of conventional high energy electron beam irradiation techniques. Such electron beam irradiation crosslinking treatment can be suitably performed in the practice of the present invention either prior to (e.g., in free single or multilayered plastic film form) or subsequent to the application of the instant multilayered thermoplastic resin coating to the steel substrate as well as (though less preferably) after formation of the can body from the coated steel sheet material.

In the aforementioned irradiation treatment of such free films or plastic/metal/plastic laminate sheet material (or the can bodies formed therefrom), a total radiation dosage of from about 2 to about 20, preferably from about 5 to about 10, megarads has been found to typically be satisfactory for the purposes of the present invention.

Another feature to note in the practice of the present invention is that the interlayer adhesion between each of the above-described $\geq 250°$ F. melting point resin outer layers and its corresponding adhesive resin inner layer (i.e., the metal contacting layer) can be a determining factor in the ability of the overall multilayer structure to withstand the rather severe stresses imparted during draw-redraw can body formation and/or any residual stress remaining during the subsequent canning/processing operations. In some cases, (e.g., in the case of a high density polyethylene or nylon outer layer and a random ethylene/ethylenically unsaturated carboxylic acid copolymer inner layer) the direct interlayer adhesion between such inner and outer thermoplastic resin layers has been found to generally be sufficient to withstand such stresses. However, in other cases, the direct adhesion between such layers may not be alone sufficient to withstand the indicated stresses. Accordingly, in this latter type of circumstance, it may be necessary or desirable to employ an intermediate adhesive or compatiblizing layer of a third thermoplastic resin (or of a resin blend) which exhibits good adhesion to both of the resins employed, respectively, in the outer and inner layers of the subject multilayer thermoplastic resin coating.

Naturally, after the draw-redraw cans have been prepared in accordance with the present invention, they are employed in the conventional fashion in their intended ultimate end-use for the canning, processing and storage of various food and/or beverage products.

The practice of the present invention is further illustrated by reference to the following non-limiting working examples.

EXAMPLES 1 and 2

In these examples, two multilayered plastic/chrome-chrome oxide coated steel/multilayered plastic laminates are prepared by laminating a previously prepared multilayered plastic film to both sides of a chrome-chrome oxide coated steel sheet having a thickness of 7.5 mils. The lamination is conducted by preheating the steel sheet to about 400° F. and passing said preheated steel sheet through closed nips already threaded with the two multilayered films and by then post-heating the so-formed laminate in a hot air oven at an elevated temperature (i.e., 400° F. for Example 1 and about 430° F. for Example 2) for 5 minutes. Each of these laminates is then irradiated on each side with a total per-side irradiation dosage of 5 megarads of high energy electron beam irradiation. Thereafter, the resulting irradiated laminate is formed into a 307×303 size can body via a draw-redraw operation and the resulting can body is subjected to grease and steam resistance testing by filling the can body with grease (i.e., lard) and exposing the filled can to a temperature of 250° F. for 1 hour and by exposure to steam in an autoclave at 250° F. for 1 hour. The multilayered film employed in the individual examples, and the steam and grease resistance results for the resulting cans formed from laminates made therewith, are summarized in Table 1, below.

In addition to the laminates of Examples 1 and 2, a comparative laminate (i.e., Control 1) is prepared corresponding to the Example 1 laminate except that the electron beam irradiation treatment is eliminated. The grease and steam resistance results for a 307×303 can body formed from the Control 1 laminate are also summarized in Table 1.

TABLE 1

| Example No. | Inner Adhesive Layer | | >250° F. Melting Point Outer Layer | | Grease Test | Steam Test |
|---|---|---|---|---|---|---|
| | Type | Thickness | Type | Thickness | | |
| 1[4] | E/AA[2] | 0.3 mil | HDPE[1] | 0.7 mil | PASSED | PASSED |
| 2[4] | E/AA[2] | 0.7 mil | Nylon[3] | 0.3 mil | PASSED | PASSED |
| Control 1* | E/AA[2] | 0.3 mil | HDPE[1] | 0.7 mil | FAILED | FAILED |

*Not an example of the invention.
[1]High density polyethylene (density = 0.965 g/cc, melt index = 0.7, and melting point = 135° C.).
[2]Random copolymer of ethylene with 6.5 weight percent acrylic acid having a melt index of 5.5.
[3]Nylon 6 supplied by Allied Chemical Co. under the trade name of Capron 8207 (melting point of 216° C. and melt index at 235° C. of 4.6).
[4]Plastic/metal/plastic laminated sheet stock exposed on each side to 5 megarads of eletron beam irradiation after formation but prior to can body formation.

EXAMPLE 3

The procedure of Example 2 is repeated except that the plastic coated steel sheet is irradiated on each side with a 10 megarad dosage instead of 5 as in Example 2. The steam and grease resistance results for cans formed from the indicated irradiated laminate are summarized in Table 2, below.

In addition, a comparative run (Control 2) is also made in the same fashion and using the same 2-layer plastic film except that irradiation treatment of the resulting plastic/steel laminate is eliminated. The results for this comparative run are also summarized in Table 2, below.

TABLE 2

| Example No. | Multilayered Film Employed | Grease Test | Steam Test |
|---|---|---|---|
| 3 | 0.3 mil CAPRON ® 8207/0.7 mil EAA[1] | PASSED | PASSED |
| Control 2* | 0.3 mil CAPRON ® 8207/0.7 mil EAA | FAILED | FAILED |

[1]Laminate exposed to 10 megarad of electron beam irradiation after its formation but prior to can body formation therefrom.
*Not an example of the invention (no irradiation treatment).
CAPRON ® 8207 = Nylon 6 supplied by Allied Chemical Co. having melting point of 216° C. and melt index at 235° C. of 4.6.
EAA = Random ethylene/acrylic acid copolymer (6.5% by weight acrylic acid) supplied by The Dow Chemical Co. (melting point = 100° C. and melt index at 190° C. = 5.5).

While the present invention has been herein described with reference to various specific embodiments and examples thereof, such examples and embodiments are not to be understood as limiting the scope of the instantly claimed invention.

What is claimed is:

1. In a draw-redraw process for forming a steel food or beverage can body, the improvement comprising (A) the use in such process of a laminated or extrusion coated steel sheet material having adhered to both major planar surfaces thereof a multilayered synthetic thermoplastic resin coating comprising (1) an adhesive synthetic thermoplastic resin inner layer which comprises at least a major proportion of a normally solid random copolymer of a major proportion of ethylene with from about 1 to about 30 weight percent, based upon such copolymer, of an ethylenically unsaturated carboxylic acid monomer and which is bonded directly to the surface of said steel sheet, and (2) an outer layer of a synthetic thermoplastic polymer resin which has a crystalline melting point of at least about 250° F. and which is adhered to said adhesive resin inner layer and (B) the exposure of such multilayered coatings to an electron beam irradiation dosage of from about 2 to about 20 megarads either prior to, during or subsequent to the application of such coatings to said steel sheet material.

2. The process improvement of claim 1 wherein the steel sheet is chrome/chrome oxide coated steel.

3. The process improvement of claim 1 wherein the adhesive synthetic thermoplastic resin layers comprise a copolymer of a major proportion of ethylene with from about 2 to about 20 weight percent, based upon such copolymer, of acrylic or methacrylic acid.

4. The process improvement of claim 1 wherein the electron beam irradiation dosage employed is from about 5 to about 10 megarads.

5. The process improvement of claim 1 wherein the outer thermoplastic polymer layers comprise a high density polyethylene resin having melt index of 3 or less and a density of at least about 0.960 or a polyamide resin.

6. The process improvement of claim 1 wherein the outer thermoplastic polymer layers comprise a blend of a high density polyethylene resin having a melt index of 3 or less and a density of at least about 0.960 with up to about 30 weight percent based upon the weight of such blend of a low density polyethylene resin.

7. The process improvement of claim 1 wherein the electron beam irradiation of the multilayered synthetic thermoplastic resin coatings is conducted prior to the draw-redraw formation of the food or beverage can body from the laminated or extrusion coated steel sheet.

8. The process improvement of claim 1 wherein the electron beam irradiation is conducted on the multilayered coatings in free film form prior to the application of such coatings to the steel sheet material.

9. The process improvement of claim 1 wherein the steel sheet material has a thickness of from about 5 to about 15 mils.

10. The process improvement of claim 1 wherein each of the multilayered synthetic thermoplastic resin coatings has an overall thickness of from about 0.2 to about 2.8 mils.

11. A drawn food or beverage container made of a laminated or extrusion coated steel sheet material comprising a steel sheet substrate having adhered to both major surfaces thereof a multilayered synthetic thermoplastic resin coating (A) comprising an adhesive synthetic thermoplastic resin inner layer which is composed of at least a major proportion of a normally solid random copolymer of ethylene with from about 1 to about 30 weight percent, based upon said copolymer, of an ethylenically unsaturated carboxylic acid monomer and which copolymer is bonded on one side directly to the surface of said steel sheet and is adhered on its other side to an outer layer of a synthetic thermoplastic polymer resin having a crystalline melting point of at least about 250° F. and (B) having been exposed to an electron beam irradiation dosage of from about 2 to about 20 megarads; said container having been formed by a draw-redraw can forming process.

12. A method of making draw-redraw food or beverage can bodies comprising the steps of:
    (1) extrusion coating or laminating to both sides of a steel sheet material a multilayered synthetic thermoplastic coating comprising an inner layer of an adhesive synthetic thermoplastic resin composed of at least a major proportion of a normally solid random copolymer of ethylene with from about 1 to about 30 weight percent, based upon such copolymer, of an ethylenically unsaturated carboxylic acid monomer and an outer layer of a synthetic thermoplastic polymer resin having a crystalline melting point of at least about 250° F., said inner layer being bonded on one side thereof directly to the surface of said steel sheet and being adhered on its other side to said outer thermoplastic resin layer;
    (2) irradiating both multilayered thermoplastic coatings either prior or subsequent to the application thereof to the steel sheet material with an electron beam irradiation dosage of from about 2 to about 20 megarads; and
    (3) forming the coated metal sheet into can bodies via a draw-redraw can forming process.

13. A method of making a draw-redraw food or beverage can body comprising the steps of:
    (1) irradiating a multilayered synthetic thermoplastic film comprising (a) a first surface layer of an adhesive synthetic thermoplastic resin composed of at least a major proportion of a normally solid random copolymer of ethylene with from about 1 to about 30 weight percent, based upon such copolymer, of an ethylenically unsaturated carboxylic acid monomer and (b) a second surface layer of a synthetic thermoplastic resin having a crystalline melting point of at least about 250° F. with an electron beam irradiation dosage of from about 2 to about 20 megarad;
    (2) laminating the resulting irradiated multilayered film to both major surfaces of a steel sheet material in a manner such that the adhesive resin surface of both multilayered film layers is directly adhered to the corresponding surfaces of said steel sheet; and
    (3) thereafter forming the resulting irradiated coated metal sheet into can bodies via a draw-redraw can forming process.

* * * * *